United States Patent [19]
Fortman et al.

[11] 3,888,097
[45] June 10, 1975

[54] MACHINE HAVING A DRIVE SHAFT AND A METHOD OF OPERATION

[75] Inventors: Ronald F. Fortman, Fort Loramie; John E. Voorhees, Sidney, both of Ohio

[73] Assignee: The Minster Machine Company, Minster, Ohio

[22] Filed: Apr. 11, 1974

[21] Appl. No.: 460,217

[52] U.S. Cl. .......... 72/26; 72/30; 72/444; 192/18 A; 192/146
[51] Int. Cl. .......... B21j 9/20
[58] Field of Search .......... 72/26, 30, 21, 444; 192/146, 18 A

[56] References Cited
UNITED STATES PATENTS

| | | | |
|---|---|---|---|
| 1,404,072 | 1/1922 | Topham | 192/146 |
| 2,472,452 | 6/1949 | Wissman | 192/18 A |
| 2,840,135 | 6/1956 | Fowler | 72/26 |
| 3,042,166 | 7/1962 | Crane | 192/18 A |
| 3,157,261 | 11/1964 | Bono | 192/146 |

*Primary Examiner*—C. W. Lanham
*Assistant Examiner*—Gene P. Crosby
*Attorney, Agent, or Firm*—Albert L. Jeffers; Roger M. Rickert

[57] ABSTRACT

A control system is provided for slowing down the crankshaft of a high speed machine, such as a mechanical press, when it is operated at a high speed to permit it to be stopped at a predetermined rotated position. The control provides for braking the crankshaft when it is running at high speed until the speed is reduced to a predetermined lower speed and for then permitting the crankshaft to coast to a predetermined rotated position and for then applying the brake so that the crankshaft will halt in the proper position. When the crankshaft is rotating at a lower speed, it may be halted by disengaging the clutch and applying the brake at a predetermined rotated position of the crankshaft without the intervening coasting of the crankshaft.

19 Claims, 5 Drawing Figures

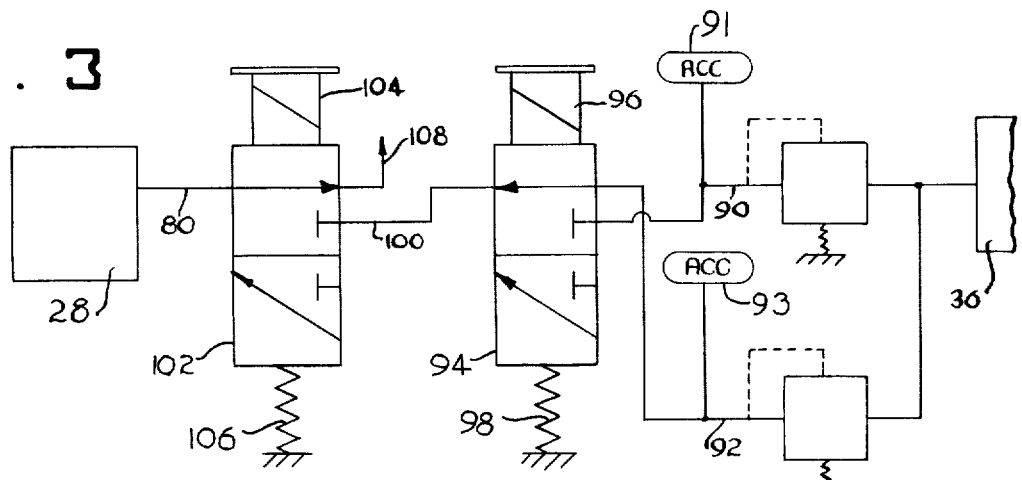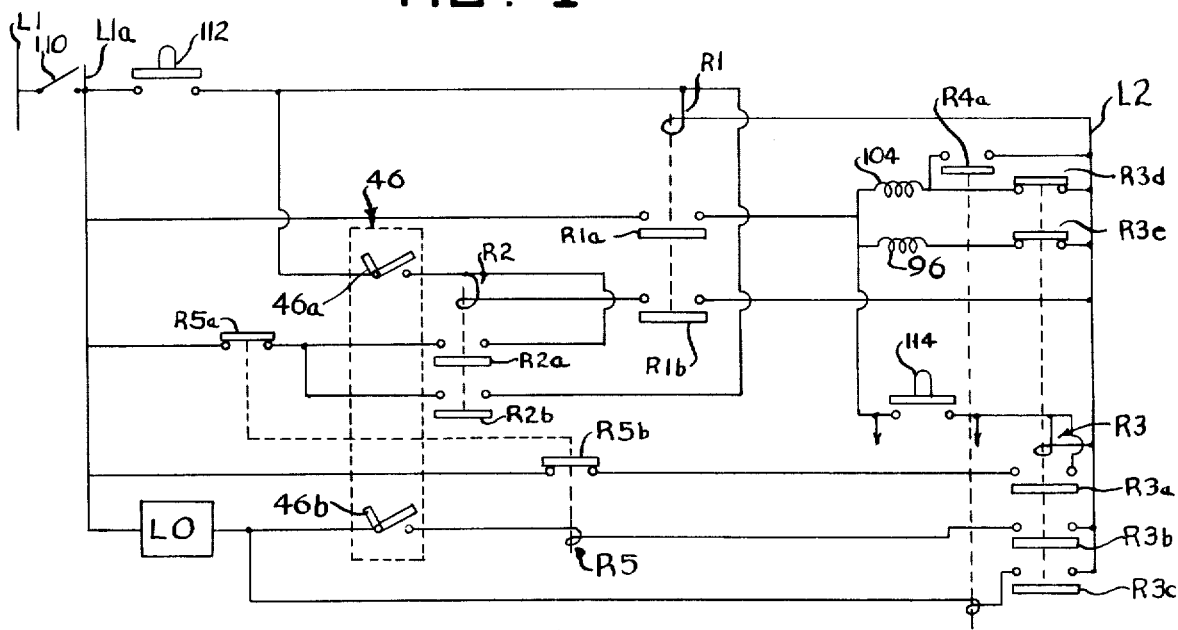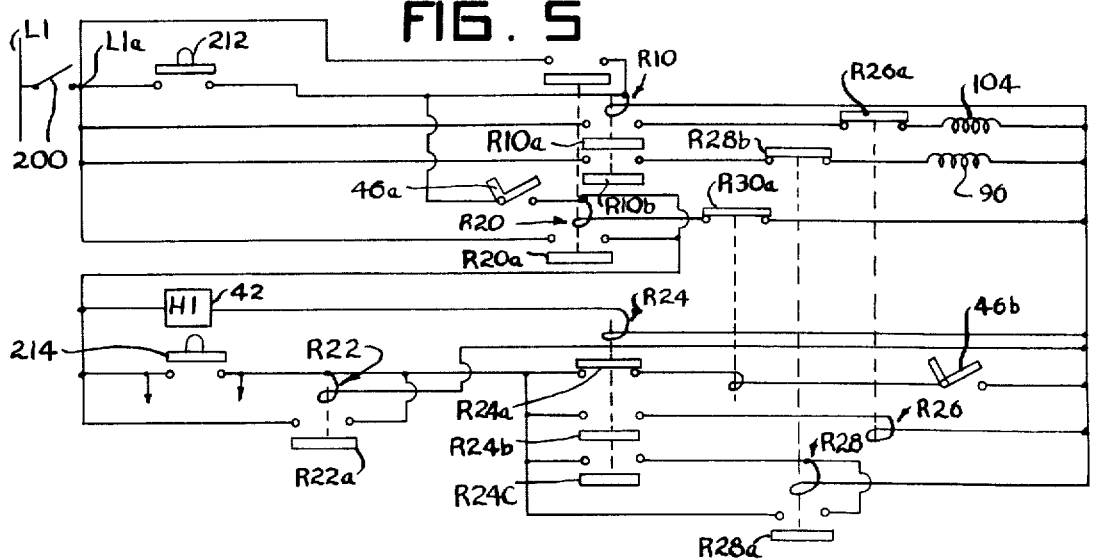

3,888,097

MACHINE HAVING A DRIVE SHAFT AND A METHOD OF OPERATION

The present invention relates to machines, especially high speed machines, such as high speed mechanical presses, and is particularly concerned with a control system for use with such a machine.

Mechanical presses are known and, in general, comprise a frame having a platen, or slide, reciprocably guided therein with at least one crankshaft rotatable in the frame and connected to the slide by at least one connecting rod so that when the crankshaft rotates in the press frame, the slide will reciprocate therein. A flywheel is provided in the press frame which is driven by a motor, and the flywheel is clutched to the crankshaft, either directly or through gearing, in order to drive the crankshaft in rotation thereby to cause the slide to reciprocate.

When the press is stopped, the clutch is disengaged and a brake operatively interposed between the crankshaft and press frame is engaged thereby to halt the crankshaft. The slide is arranged in opposed relation to the bed of the press, and when the crankshaft is halted, it advantageously halts with the slide in its maximum position of retraction from the press bed.

In more or less conventional slow speed presses which operate at speeds at which the crankshaft rotates only a few hundred revolutions per minute, no problem is encountered in stopping the crankshaft in the proper position by merely disengaging the clutch and engaging the brake at a certain rotated position of the crankshaft, whereupon it will come to a halt in about the proper position with the slide substantially retracted from the bed.

However, presses of this nature have more recently been operated at high speeds, up to about two thousand revolutions per minute of the crankshaft, and under these conditions, it is not possible merely to disengage the clutch and engage the brake and depend upon the crankshaft stopping in the desired position. This comes about because the mass of the moving parts is so large that a brake which would stop the crankshaft in, say, ½ revolution, would be impractically large. Furthermore, the forces developed in bringing the mass to a halt in such a short time would result in such high stresses in the mechanism that breakage would be a likely possibility.

With the foregoing in mind, a primary objective of the present invention is the provision of a control system and a method of operation for a high speed mechanical press which will be operable for bringing the press crankshaft to a halt in the proper rotated position thereof without, however, requiring excessively large braking devices or the like.

Another object of the present invention is the provision of a method of operating a press and a control system therefor in which the control system includes devices for monitoring the crankshaft speed and rotated position, and which monitoring devices provide for conventional halting of the press crankshaft when it is operating at slow speed and for halting of the crankshaft according to the present invention when it is operating at a higher speed.

A still further object is the provision of a control system for a high speed press and a method of operating the press in which the crankshaft of the press, when operating at high speed, is brought to a halt by first braking the crankshaft to a lower speed, and then permitting the crankshaft to coast to a certain position, and then again braking the crankshaft to a halt.

A still further object is the provision of a mechanical press, especially a high speed mechanical press, having a control system of the nature referred to above which permits the use of substantially conventional components in respect of the clutch and brake for the press while still effecting the type of control referred to above.

Still another object is the provision of a system for bringing a high speed machine having a drive shaft to a halt with the machine parts in a predetermined position.

BRIEF SUMMARY OF THE INVENTION:

According to the present invention, a mechanical press is provided having a frame which has a bed therein and reciprocably guided in the press frame in opposed relation to the bed is a press platen or press slide. Rotatable in the frame on the opposite side of the slide from the bed is at least one crankshaft having at least one throw thereon which is connected by a connecting rod with the press slide so that as the crankshaft rotates, the slide will reciprocate in the press frame toward and away form the press bed.

A motor driven flywheel is provided for driving the crankshaft and a clutch is provided interposed between the crankshaft and the flywheel which, upon engagement thereof, establishes a driving connection between the flywheel and the crankshaft for causing the crankshaft to rotate. Interposed between the crankshaft and the press frame is a brake which, upon being engaged, will brake the crankshaft to a halt in the press frame.

The clutch and brake can be combined as a single unit so that, whenever one of the clutch and brake is engaged, the other is automatically disengaged or the clutch and brake can be in the form of separate units. Furthermore, more than one brake could be provided, or there could be provided a clutch-brake unit of the type referred to above together with a further brake separate from the one embodied in the clutch-brake unit. The clutches and brakes are advantageously operated by air pressure under the control of solenoid operated valves, although they could also be operated electrically, or hydraulically.

The crankshaft in its normally halted position is disposed at that angle at which the slide is retracted the furthest distance away from the press bed. For setting the crankshaft into motion from its stopped position, the brake is disengaged and the clutch is engaged.

At normal operating speeds, the crankshaft can be brought to a halt near the aforementioned top stop position by disengaging the clutch and engaging the brake when the crankshaft is near that position wherein the slide is at the bottom of its stroke or nearest the bed. Normally, the crankshaft will coast up to about its top stop position and will come to a halt in that position.

However, when the crankshaft is rotating at high speed up to, say, 2,000 revolutions per minute or the like, it will require 4 or 5 revolutions to be brought to a halt utilizing a substantially conventional brake arrangement. It is desirable, however, to bring the crankshaft to a halt near its top stop position. With a slow speed press, which can be brought to a halt in about 180° of revolution of the crankshaft with an error of, say, 5 to 10 per cent, the crankshaft always halts sufficiently near the top stop position.

However, an error of 5 to 10 per cent in the stopping distance when the crankshaft requires 4 or 5 revolutions to come to a halt will not stop the crankshaft reliably near enough to its top stop position.

According to the presnet invention, when a press crankshaft is rotating at high speed, it is stopped in a series of steps, the first of which consists of disengaging the clutch and engaging the brake. This is effective for slowing down the crankshaft, and when it reaches a predetermined lower speed, the brake is released without reengaging the clutch and the crankshaft is permitted to coast to a predetermined rotated position which, in the normal course of events, is somewhere near that position where the slide is at or near the bottom of its stroke, but preferably not at a location before the bottom of its stroke.

At this point, the brake is again engaged, and the crankshaft will be brought to a halt quite near its top stop position. The control system is so arranged that when the crankshaft is rotating at a lower speed such that the crankshaft can be stopped in the conventional manner, the crankshaft is brought to a halt merely by disengaging the clutch and engaging the brake at a predetermined rotated position of the crankshaft whereupon the crankshaft will come to a halt satisfactorily near the top stop position thereof. The control system includes speed sensors and at least one position sensor with the sensors being integrated into the control system to produce the desired result.

The several objectives referred to above as well as other objects and advantages of the present invention will become more apparent upon reference to the following detailed specification taken in connection with the accompanying drawings in which:

FIG. 3 is a schematic fluid circuit showing one manner in which the clutch-brake unit of FIG. 2 could be controlled.

FIG. 4 is a schematic electrical control circuit for controlling the solenoid operated valves of FIG. 3.

FIG. 5 shows another control circuit arrangement.

Figure 1:
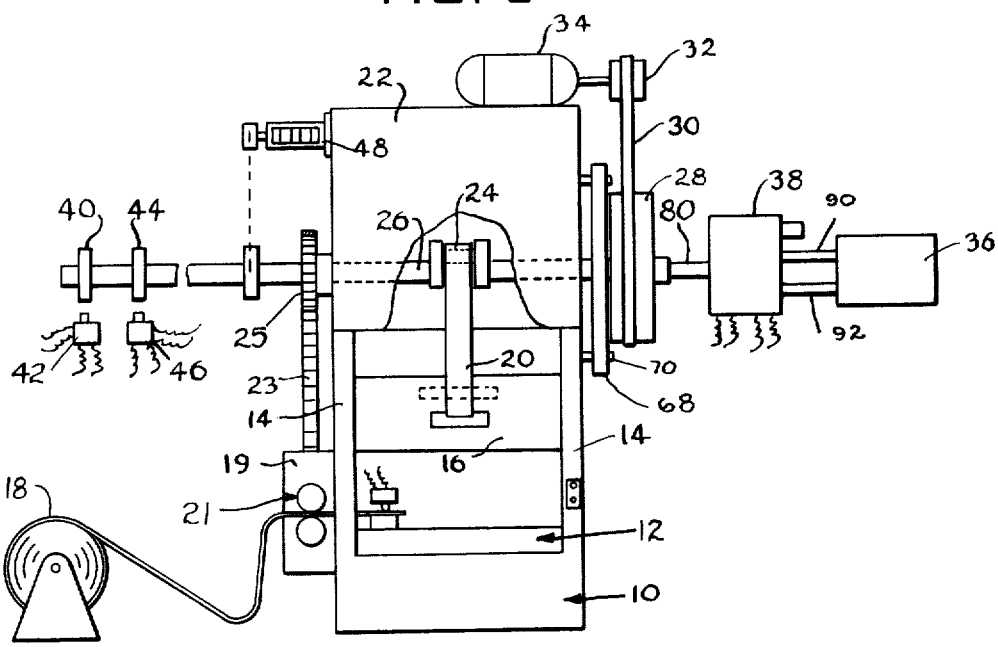
FIG. 1 is an extremely schematic representation of a mechanical press adapted for having the control system of the present invention incorporated therein and showing at least one speed sensor and one position sensor incorporated therein.

DETAILED DESCRIPTION OF THE INVENTION:

Referring to the drawings somewhat more in detail, the press shown in FIG. 1 comprises a press frame generally indicated at 10 and which has a bed portion on which a bolster plate 12 may be mounted. The press frame comprises laterally spaced uprights 14. Guided on uprights 14 is a press platen or slide 16 which is moveable toward and away from the press bed.

Cooperating elements of working tools such as forming and blanking dies and the like are mounted on the underside of slide 16 and on top of bolster 12 and cooperate during operation of the press for performing work operations on workpieces, such as strip stock or the like. Strip stock may, for example, be fed laterally through the press from a reel thereof disposed at the side of the press as indicated at 18 in FIG. 1. Stock feed unit 19 contains intermittently rotated rolls 21 to advance the stock, driven by the positive drive belt 23 and pulley 25 carried on crankshaft 26.

The press slide has connected thereto a connecting rod 20 extending upwardly into press head 22 and engaging the throw 24 of a crankshaft 26 which is rotatable in the press head. Outside the press frame at one side there is rotatably mounted on the crankshaft a flywheel 28 which may be driven in rotation as by belts 30 entrained over the flywheel and about a pulley 32 driven by a motor 34. Incorporated in the flywheel 28 is a clutch for clutching the flywheel to the crankshaft and iterposed between the crankshaft and the press frame is a brake for braking the crankshaft to the press frame.

The clutch and brake referred to, and which may be incorporated in a single unit, is adapted for being operated by air pressure supplied thereto from a source 36 via conduit means 80, 90, 92 which are under the control of solenoid valve means 38 which will be described more in detail hereinafter. Connected to the crankshat to be driven thereby is a toothed disc 40 which rotates adjacent a sensor element 42. The toothed disc, which is somewhat like a gear, cooperates magnetically with sensor 42 and the speed of the press can thereby be detected in a known manner.

A further disc 44 may also be driven by the crankshaft and have a single toothe thereon cooperating with a sensor 46 whereby a predetermined rotated position of the crankshaft can be detected, especially for actuating the clutch and brake or, at least, the brake, to bring the crankshaft to a halt in the proper position. There may also be provided a counter mechanism 48 driven by the crankshaft so that the number of rotations of the crankshaft from the instant of starting thereof can be determined and also so that control functions can be performed by the counter, such as stopping the crankshaft after a certain number of workpieces have been made thereby.

Figure 2:
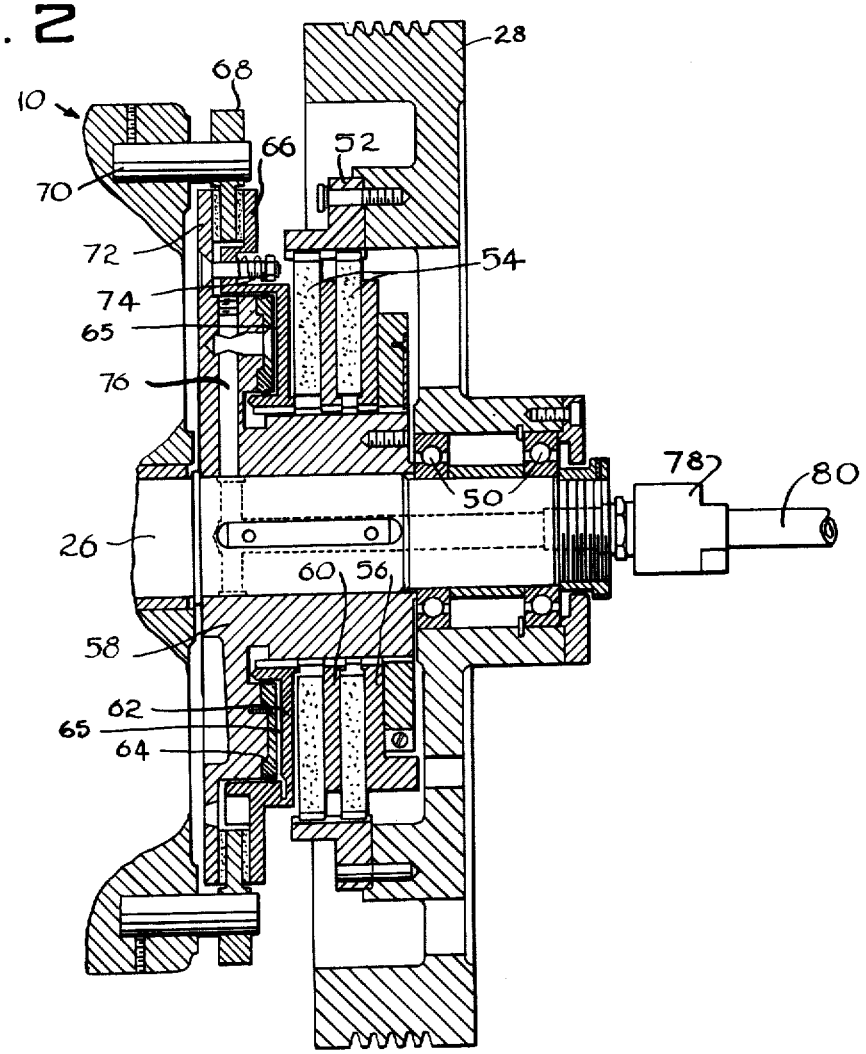
FIG. 2 is a detailed sectional view taken through the clutch-brake unit of the press of FIG. 1.

FIG. 2 shows more in detail the construction of the aforementioned clutch and brake. In FIG. 2, flywheel 28 is mounted on crankshaft 26 as by bearings 50 so as normally freely to rotate on the crankshaft. Bolted to the flywheel 28 on the side nearest press frame 10 is an internally splined ring 52 which engages the splined outer periphery of a pair of friction discs 54.

On one side of the friction discs 54 is a stationary pressure plate 56 splined to a hub 58 that is keyed to the crankshaft. Between friction discs 54 is a further pressure plate 60 splined to hub 58 and on the opposite side thereof is a fluid operated pressure plate 62 forming an annular cylinder 65 in which a piston 64 is disposed. Plate 62 has a radially extended outer portion 66 disposed on one side of a brake disc 68 which is axially moveably but nonrotatably held on press frame 10 as by pins 70. On the opposite side of brake disc 68 is a radial flange 72 forming a part of hub 58 which, as mentioned, is fixed to the crankshaft. Between flanges 72 and 66 there are arranged the compression springs 74 which continuously urge the plates toward each other.

A fluid passage 76 is provided in hub 58 and crankshaft 26 and leading through a rotary coupling 78 to the conduit means 80 which is connected to solenoid operated valve means 38 of FIG. 1.

At this point, it will be evident that when the cylinder in which piston 64 is disposed is exhausted, springs 74 will urge flanges 66 and 72 toward each other and thereby engage therebetween brake discs 68 and either brake the crankshaft to a halt or hold the crankshaft stationary in its respective position.

At this time, the flywheel 28 is free to rotate on the crankshaft. When, however, conduit 80 is under pressure, this pressure will pass through coupling 78 and passage 76 into the cylinder and cause rightward movement of pressure plate 62 which will disengage the aforementioned brake while simultaneously clamping friction discs 54 between the several pressure plates thereby clutching the crankshaft to the flywheel to be rotated thereby.

FIG. 3 shows a valve arrangement that can be provided for controlling the clutch and brake referred to above. In this valve arrangement, high pressure, say about 60 pounds per square inch is provided via a conduit 90 whereas a kiwer oressyrem satm abiyt 30 pounds per square inch is provided via a conduit 92. At 60 pounds pressure supplied to the clutch-brake unit, the clutch is fully engaged where at 30 pounds per square inch the clutch is not fully engaged and neither is the brake engaged and the crankshaft is substantially free for coasting in the press frame.

Conduits 90 and 92 are connected to the inlet ports of a valve 94 having a solenoid actuator 96 and a return spring 98. Accumulators 91, 93 are connected to conduits 90, 92, respectively, to minimize pressure changes during flow changes, When solenoid 96 is energized, conduit 90 is connected to conduit 100 while conduit 92 is disconnected therefrom and when solenoid 96 is deenergized conduit 92 is connected to conduit 100 and conduit 90 is disconnected therefrom.

Conduit 100 is connected to a valve 102 which has an actuating solenoid 104 and a return spring 106. Valve 102 also has an exhaust conduit 108 leading therefrom. When solenoid 104 is energized, conduit 80 is connected to conduit 100, and when solenoid 104 is deenergized, conduit 80 is connected to exhaust conduit 108.

In operation, if solenoid 104 of valve 102 is energized to connect conduit 80 to conduit 100 and solenoid 96 of valve 94 is energized to connect conduit 100 to conduit 90, then high pressure will be supplied to the clutch-brake unit described above and the brake will be disengaged and the clutch will be actuated.

If, while solenoid 104 of valve 102 is energized, the solenoid 96 is deenergized, than conduit 100 will be connected to conduit 92 and low pressure will be supplied to the clutch-brake unit which will disengage the clutch without, however, engaging the brake. At any time that solenoid 104 of valve 102 is deenergized, the conduit 80 will be connected to conduit 108 thereby exhausting the clutch-brake unit and fully disengaging the clutch while fully engaging the brake.

FIG. 4 shows one form of an electrical circuit that could be employed for controlling the energization and deenergization of valve solenoids 96 and 104 according to the present invention.

In FIG. 4, main power lines are indicated L1 and L2 and an on-off switch 110 is provided which, when closed, connects line L1a to line L1.

A start switch 112 is provided which, when closed, will connect the coil of a relay R1 between lines L1a and L2 thereby causing the contacts R1a and R1b of the relay to close. When blade R1a closes, solenoids 96 and 104 are both energized so that high pressure is supplied to the clutch-brake unit and the press commences to run.

As the slide approaches the bottom of its stroke, the position indicator 46 is actuated to close its blade 46a, and this is operable to complete an energizing circuit for the coil of a relay R2 thereby to close its blades R2a and R2b. Blades R2a and R2b provide a holding circuit for the coils of relays R1 and R2 so that the start button 112 can now be released and the press will continue to run. It will be noted that the coil of relay R2 can be energized only when blade R1b of relay R1 is closed and while the start switch 112 is closed.

If now, while the press is running, the stop switch 114 is depressed, the coil of a relay R3 will be energized thereby to close its blades R3a, R3b and R3c while opening its blades R3d and R3e. Blade R3d is in series with solenoid 104 and blade R3e is in series with solenoid 96 so that in the normal course of events both of the solenoids would be deenergized.

However, in series with blade R3c is the coil of still another relay R4 which has a blade R4a in parallel with blade R3d. Relay R4 is connected to one side of the speed sensor 42, the other side of which is connected to line L1a. Speed sensor 42 is open whenever the speed of the crankshaft is above a predetermined speed and closes when the speed of the crankshaft is below the said predetermined speed.

The side of switch 42 nearest the coil of relay R4 is also connected to one side of normally open switch 46b forming a part of the position sensor and which closes when the press slide is near the bottom of its stroke. This last mentioned switch is in circuit with the coil of a further relay R5 and which coil is in series with the aforementioned blade R3b. Relay R5 has normally closed blades R5a in the holding circuit for the coils of relays R1 and R2 and R5b which is in the holding circuit for the coil of relay R3.

The operation of the circuit of FIG. 4 is as follows:

After closing switch 110 which will energize line L1a, switch 112 can be closed to energize relay R1 which will, via its blade R1a, energize both of solenoids 96 and 104 thus disengaging the clutch-brake and engaging the clutch and causing the press crankshaft to commence to rotate. When the crankshaft has rotated far enough to bring the slide near the bottom of its stroke, switch 46a closes and this will energize relay R2 which establishes a holding circuit for both of relays R1 and R2. The start switch 112 can now be released and the press will continue to run.

Wehn it is desired to stop the press, switch 114 may be manually closed and this will engergize relay R3 which will open both of blades R3d and R3e which would normally deenergize both of solenoids 96 and 104. If, however, the press crankshaft is rotating at a speed higher than the aforementioned predetermined speed, switch 42 will be open so that relay R4 cannot be energized whereby both of solenoids 96 and 104 will be deenergized and the press brake will be engaged.

When the press has slowed down to the said predetermined lower speed or lower so that switch 42 closes, then relay R4 will be energized and close its blade R4a thereby again energizing solenoid 104. At this time, solenoid 104 is energized and solenoid 96 is deenergized and, accordingly, lower pressure is supplied to the press clutch-brake unit and the clutch will be disengaged but the brake will not be engaged and the press cranksahft will coast.

When the press crankshaft reaches a predetermined angular position, and which may be near the bottom of the stroke of the press slide switch 46b will be closed thereby energizing relay R5. Energization of relay R5 will open its blades R5a and R5b whereupon both of relays R1 and R2 and also relay R3 will be deenergized, with the deenergization of relay R3 also immediately deenergizing relay R4. With all of the relays deenergized, valve solenoids 96 and 104 are both deenergized and the press brake will be engaged and the press will come to a halt at or near the top of the stroke of the press slide.

As has been mentioned, if the brake is set at a certain angular position of the crankshaft when the press is running at a predetermined slow speed, the crankshaft will be braked to a halt with the slide just about at the top of its stroke.

If the brake was applied when the press was running above the aforementioned predetermined speed, the crankshaft would coast beyond the desired stopping position thereof. Thus, according to the present invention, when the press crankshaft is rotating below the aforementioned predetermined speed, closing of stop switch 114 will bring about deenergizing of solenoid 104 the instant the crankshaft reaches a predetermined angular position and which position is that position of the crankshaft from which it will rotate to a certain top stop position after the application of the press brake.

If, however, the press is rotating above the predetermined speed, the closing of stop switch 114 will bring about immediate deenergization of both of solenoids 96 and 104 and the crankshaft will be braked and will commence to slow down. When the crankshaft has dropped below the predetermined lower speed, speed detector switch 42 will close and, at that time, the coil of relay R4 will be energized to close its blade R4a thereby energizing solenoid 104 and permitting the press crankshaft to coast.

The press crankshaft will coast until it reaches the aforementioned angular position at which time position detector switch 46b will be closed thereby energizing relay R5 and clearing the entire circuit at the aforementioned angular position whereby the brake will again be applied and the crankshaft will come to a halt at or quite near to the top stop position thereof.

It will be evident that the above described circuit derives the stop signal in response to the closing of manual switch 114, but it is also possible to derive the stop signal from counter 48 after a predetermined number of cycles of the press merely by connecting momentary contacts embodied in counter 48 in parallel with stop switch 114.

Further, a buckle detector switch 116 could be provided (FIG. 1) and connected in parallel with stop switch 114. Switch 116 is adapted to be closed if the stock being fed into the press from reel 118 thereof buckles. It will be evident that other arrangements could be arrived at for supplying the signal which causes the press to stop.

It is also the case that emergency stop means could be provided in a conventional manner which would be effective for disengaging the clutch and applying the brake in any angular position of the crankshaft to effect stopping of the press in the shortest possible time.

The circuit described above is effective for controlling two solenoids with each of the solenoids controlling a respective valve and with the valves connected between the supply of air pressure and the clutch-brake unit. It will be understood that the two solenoids could be associated with a single valve if so desired or the respective valves could be arranged so that one controlled the press clutch and the other controlled the press brake.

In this last mentioned case, wherein the clutch and brake are separate, energization of one solenoid would engage the clutch, whereas energization of the other solenoid would disengage the brake. Under these circumstances, the press would run with both of the solenoids energized and would be stopped from a low speed by deenergizing both solenoids. From a high speed, however, the press would be stopped by first deenergizing both solenoids and then at a lower speed energizing the brake solenoid to have the press coast and having the angular position of the crankshaft again used as the parameter sensed to control deenergizing the brake solenoid to brake the crankshaft to a halt at the proper rotated top stop position thereof.

It is preferable for the brake to be engaged by spring force and disengaged by fluid pressure and for the clutch to be disengaged by spring force and engaged by fluid pressure for the reason that failure of fluid pressure or the electric control circuit would bring about engaging of the brake. It is possible, however, for the operation of the clutch and brake to be inverted from that referred to above.

It will be understood that, while the press has been illustrated and described as having a single clutch and a single brake, it is possible for the press to have a further brake associated with the crankshaft as well. All of the various possibilities referred to in respect of clutches and brakes and combinations thereof are known in the art and are intended to be comprehended within the purview of the present invention.

While the control circuit illustrated is an electrical circuit utilizing more or less conventional relays and switches, it will be understood that this circuit could be in the form of an electric circuit employing logic components for routing signals for the eventual control of the valve solenoids. Such electric circuitry would have the merit of reduced cost and high operating speed.

FIG. 5 shows an alternate arrangement of the electric control circuit which operates in a slightly different manner from that of FIG. 4. In FIG. 5, switch 200 will connect power line L1a to line L1. A start switch 212 is provided which, when closed, will energize the coil of a relay R10 to close the blades R10a and R10b thereof and which will bring about energization of solenoids 96 and 104.

When the crankshaft is near the position where the slide is at the bottom of its stroke, switch 46a will close and this will supply energy to the coil of relay R20 to close its blades R20a and R20b which establishes a holding circuit for relay R10 and R20. The press is now running and will continue to run until a stop signal is supplied by actuating stop switch 214 or by supplying a stop signal from another source across the terminals of switch 214. When switch 214 is closed, the coil of a relay R22 is energized to close its blade R22a and which will hold the relay in and bypass switch 214.

A speed sensor 42 in the case of the modification of FIG. 5 is closed when the crankshaft speed is above a predetermined amount so that if the crankshaft is rotating rapidly, the coil of relay R24 will be energized to open its blade R24a while closing its blades R24b and R24c. Blade R24b when closed will supply energy to the coil of a relay R26 when the stop switch has been actuated.

When relay R26 is energized, its blade R26a opens and deenergizes solenoid 104.

When blade R24c is closed and the stop switch has been actuated, the coil of a relay R28 is energized to close its blade R28a which provides a holding circuit therefor and, also, to open its blade R28b which will deenergize solenoid 96.

Thus, if the stop switch is pressed while the press is rotating at high speed, both of solenoids 96 and 104 are deenergized and the crankshaft is braked. When the press drops to a predetermined lower level and switch 42 opens, the coil of relay R24 is deenergized, and this will deenergize the coil of relay R26 and permit its blade R26a to close. This will again energize solenoid 104 and low pressure will be supplied to the clutch-brake unit so the crankshaft can coast. When the crankshaft has coasted to the point that it will close switch 46b, the coil of a relay R30 is energized because blade R24a is now closed, and this will open blades R30a which will clear the entire circuit and both of solenoids 96 and 104 will be deenergized and the press will come to a halt with the crankshaft in the proper rotated position.

Modifications may be made within the purview of the appended claims.

What is claimed is:

1. The method of operating a machine having a frame with a shaft and a driving member rotatable therein so as to halt the shaft near a predetermined first rotated position when the shaft must be stopped from rotation at either high or low speed, said method comprising; clutching the shaft to the driving member to drive the shaft, applying a brake to the shaft at a predetermined second rotated position thereof with the clutch released to halt the shaft near said first rotated position, and when the shaft is rotating above a predetermined speed applying the brake while releasing the clutch to slow the shaft down to near said predetermined speed, and then releasing the brake to permit the shaft to coast to said second predetermined rotated position and then again applying said brake to the shaft.

2. The method according to claim 1 in which the machine is a mechanical press.

3. The method according to claim 1 in which the shaft is a crankshaft.

4. The method according to claim 1 in which the driving member is a flywheel.

5. The method according to claim 1 in which the machine is a mechanical press, the shaft is a crankshaft, and the driving member is a flywheel.

6. The method according to claim 1 which includes sensing the speed of the shaft and developing a signal in conformity with the sensed speed, and controlling the application of the brake to the shaft in conformity with said signal.

7. The method according to claim 6 which includes sensing said second rotated position of said shaft and controlling the application of the brake to the shaft in conformity with said signal.

8. The method according to claim 1 which includes supplying a start signal to clutch the shaft to the driving member while releasing the brake from the shaft, supplying a stop signal for releasing the clutch while applying the brake, making the stop signal effective in response to the shaft reaching said second rotated position when the shaft is rotating below a predetermined speed, making said stop signal immediately effective when the shaft is rotating above said predetermined speed and then releasing the brake when the shaft speed drops to near said predetermined speed and again applying said brake when said shaft reaches said predetermined second rotated position.

9. The method according to claim 8 which includes sensing the speed of said shaft and developing a signal indicative of the shaft speed, and controlling the response of the clutch and brake to the stop signal in conformity with said signal.

10. The method of operating a mechanical press having a frame with a crankshaft therein and a rotatable flywheel so that the crankshaft will halt near a predetermined first rotated position thereof when the crankshaft is halted from low speed operation thereof and also when it is halted from high speed operation thereof, said method comprising; clutching the crankshaft to the flywheel to rotate the crankshaft, releasing said clutch and applying a brake to the crankshaft at a predetermined second rotated position thereof when the crankshaft is rotating below a predetermined speed, releasing said clutch and applying said brake when the crankshaft is rotating above said predetermined speed, and then releasing the brake when the crankshaft is slowed down to near said predetermined speed to permit the crankshaft to coast and again applying said brake when the crankshaft coasts into said predetermined second rotated position.

11. The method of operating a mechanical press having a crankshaft and a flywheel to cause the crankshaft to come to rest near a first rotated position thereof whenever it is halted from rotation, said press including a brake which will halt said crankshaft near said first rotated position if applied to the crankshaft at a second rotated position thereof when the crankshaft is rotating below a predetermined speed, said method comprising;

I. When the crankshaft is rotating at or below said predetermined speed,
   a. releasing the clutch and applying the brake when the crankshaft reaches said second rotated position thereof, and II. When the crankshaft is rotating above said predetermined speed,
   a. releasing the clutch and applying the brake to slow the crankshaft down,
   b. releasing the brake when the crankshaft drops to said predetermined speed to permit the crankshaft to coast, and
   c. again applying said brake when the crankshaft reaches said second rotated position thereof.

12. The method according to claim 11 which includes supplying a stop signal to initiate halting of the crankshaft, sensing the speed of the crankshaft and developing a signal indication of the crankshaft speed, and selecting I or II in conformity with said signal.

13. The method of operating a mechanical press to cause the crankshaft to come to a halt near a predetermined first rotated position when braked to a halt from either low speed or high speed rotation which comprises; clutching the crankshaft to a driven member to drive the crankshaft in rotation, sensing the speed of the crankshaft, supplying a stop signal, making the stop signal effective for unclutching the flywheel from the crankshaft and for applying a brake to the crankshaft at a predetermined second rotated position of the crankshaft when the sensed speed of the crankshaft is below a predetermined speed, and making the stop signal immediately effective for unclutching the crankshaft from the flywheel and for applying the brake to the crankshaft when the sensed speed of the crankshaft is above the predetermined speed, and for releasing said brake when the crankshaft speed is reduced to a predetermined lower speed, and for thereafter again applying said brake when the crankshaft reaches said predetermined second rotated position.

14. In a mechanical press having a frame and a crankshaft rotatable in the frame, a driven flywheel, clutch means engageable to clutch said flywheel to said crankshaft and brake means engageable for braking the crankshaft in the frame and operable to bring said crankshaft to rest near a predetermined first rotated postion if applied near a predetermined second rotated position of the crankshaft when the crankshaft is rotating no faster than a predetermined speed; first means actuatable for disengaging said brake means and engaging said clutch means, second means actuatable for disengaging said clutch means and engaging said brake means, third means actuatable for disengaging both said clutch means and said brake means, means for supplying a stop signal when said first means is actuated and the crankshaft is rotating, and control means operable in response to said stop signal when the crankshaft is rotating above said predetermined speed for actuating said second means and for then actuating said third means when the crankshaft has slowed down to a second speed near said predetermined speed and for again actuating said second means when the crankshaft has reached said second rotated position to halt said crankshaft in a predetermined second angular position.

15. A mechanical press according to claim 14 in which said control means is operable in response to the supplying of a stop signal thereto when the crankshaft is rotating at a speed less than said predetermined speed to actuate said second means immediately upon the crankshaft reaching said first angular position thereof.

16. A mechanical press according to claim 15 which includes spring means for actuating one of said clutch means and brake means into actuated position while simultaneously disengaging the other thereof and fluid operable means arranged in opposing relation to said spring means, said fluid operable means being responsive to a predetermined higher pressure to disengage said one of said clutch means and brake means while engaging the other thereof and to a predetermined lower pressure for disengaging said one of said clutch means and brake means while not engaging the other thereof, one of said first and third means supplying said higher pressure to said fluid operable means and the other thereof supplying said lower pressure to said fluid operable means.

17. In a mechanical press; a frame, a crankshaft rotatable in the frame, a rotatable flywheel, clutch means interposed between the flywheel and the crankshaft and brake means interposed between the frame and the crankshaft, said brake means when applied in a predetermined first rotated position of the crankshaft when the crankshaft is rotating at not more than a predetermined speed bringing the crankshaft to rest near a predetermined second rotated position; first means operable to engage said clutch means while disengaging said brake means to drive said crankshaft in rotation, second means operable to engage said brake means while disengaging said clutch means to brake said crankshaft, third means operable to disengage both of said clutch means and brake means to permit said crankshaft to coast, and clutch control means controlling said first, second and third means and responsive to a start signal to actuate said first means, means responsive to a stop signal supplied to said control means to condition said control means for actuation of said second and third means, said control means including crankshaft speed and position sensing means and being operable when conditioned by a stop signal and said speed sensing means senses a crankshaft speed above said predetermined speed to actuate said second means to slow the crankshaft down to near said predetermined speed and then to actuate said third means and then to actuate said second means at said first rotated position of said crankshaft.

18. A mechanical press according to claim 17 in which said control means when conditioned by a stop signal and the speed sensing means senses a crankshaft speed below said predetermined speed is operable to actuate said second means only at said first rotated position of said crankshaft.

19. In a mechanical press having a crankshaft and a flywheel, a clutch engageable to clutch the crankshaft to the flywheel and a brake engageable for braking the crankshaft, said brake being operable to bring said crankshaft to rest near a predetermined first rotated position if actuated near a predetermined second rotated position of the crankshaft when the crankshaft is rotating at not more than a predetermined speed; first means actuatable to engage said clutch while releasing said brake, second means actuatable to engage said brake while releasing said clutch, third means actuatable to release both of said clutch and said brake; speed sensing means sensitive to crankshaft speed and developing a first signal at crankshaft speeds above said predetermined speed and a second signal at crankshaft speeds below said predetermined speed, position sensing means sensitive to the position of said crankshaft and operable to develop a third signal in response to rotation of the crankshaft into said second rotated position, means for developing start and stop singals; and a control means having inputs to which said signals are supplied and having outputs connected in controlling relation to said first, second and third means, said control means going to a fitst condition in response to a start signal and in said fitst condition actuating said first means, said control means going to a second condition in response to a stop signal and in said second condition being responsive to said first signal for actuating said second means and to said second signal for actuating said third means and being jointly responsive to said second signal and said third signal for actuating said second means.

* * * * *